Aug. 4, 1959  T. D. KELLY  2,898,121
HORSE CYCLE
Filed April 2, 1957
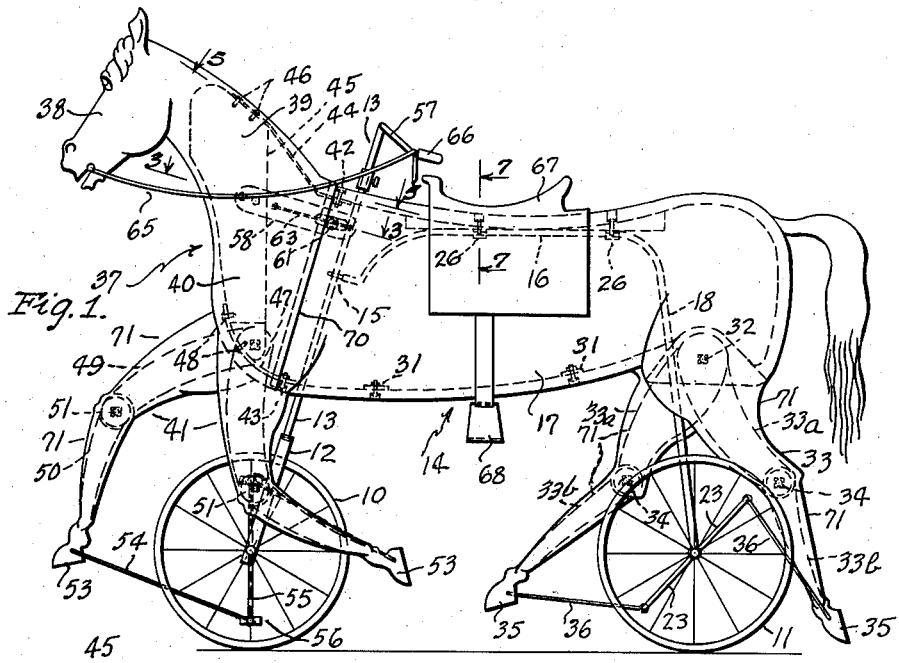
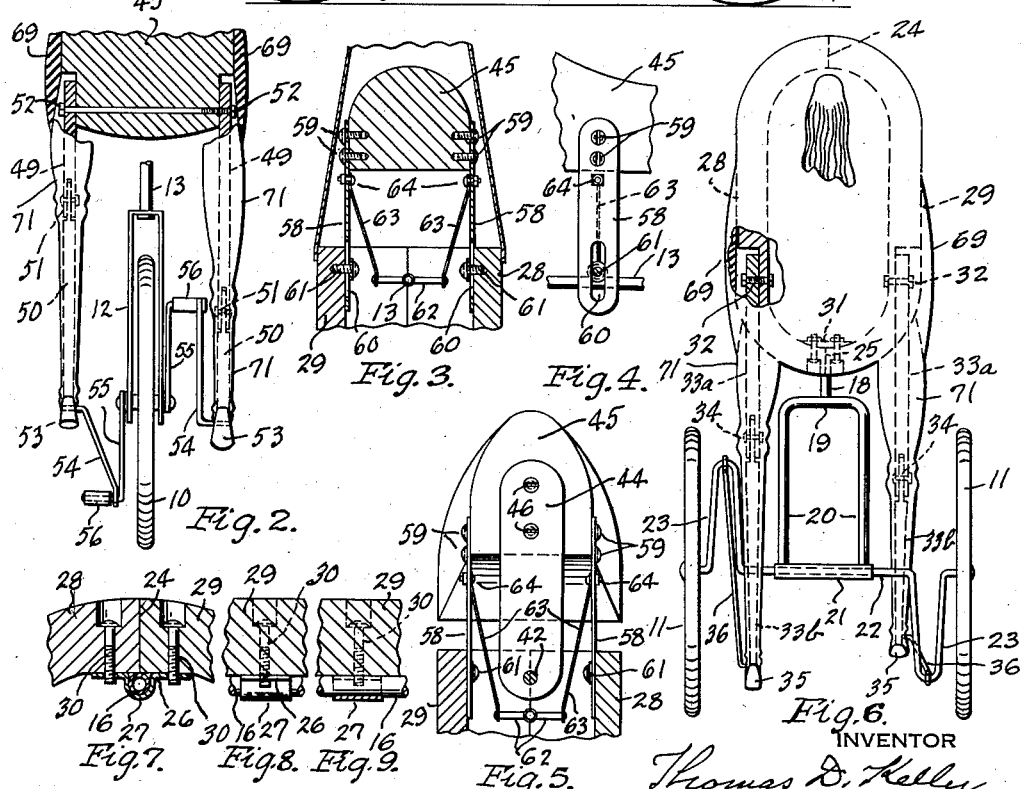
INVENTOR
Thomas D. Kelly
BY
Wooster & Davis
ATTORNEYS United States Patent Office 2,898,121
Patented Aug. 4, 1959

2,898,121

HORSE CYCLE

Thomas D. Kelly, Ansonia, Conn.

Application April 2, 1957, Serial No. 650,120

3 Claims. (Cl. 280—1.203)

This invention relates to a horse cycle, and has for an object to provide an improved construction of a wheeled cycle with the body of a horse carried thereby to be ridden by a child operating the cycle and giving the feeling of riding a horse.

Another object is to provide sections for the body so pivotally connected that a forward section comprising the head, neck and shoulders with the forelegs is swingable laterally back and forth with the operation of the front wheel of the cycle in the steering operation, to give a more natural simulation of the riding of a horse.

Another object is to provide an improved means for connecting this front section to the rear or body section of the horse, and improved means operated by the steering means for the cycle to operate the movements of this forward section of the horse's body.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side view of the horse cycle;

Fig. 2 is a detail elevation and partial section of the forelegs with the front wheel and the means for securing these legs to the body;

Fig. 3 is a detail section substantially on line 3—3 of Fig. 1;

Fig. 4 is a detail of part of the means for connecting the forward section of a horse's body to the main section, looking from the right of Fig. 3;

Fig. 5 is a detail plan view and section substantially on line 5—5 of Fig. 1 with the cover or skin portion of the horse removed;

Fig. 6 is an elevation looking toward the rear of the horse with parts broken away;

Fig. 7 is a detail of a portion of the construction substantially on line 7—7 of Fig. 1;

Fig. 8 is a section of a portion of the body and elevation of the connection of Fig. 7 looking from the right of Fig. 7, and Fig. 9 is a sectional view similar to Fig. 8 but showing the rod support in section.

The device preferably comprises a single front wheel 10 and a pair of rear wheels 11, although it could be constructed as a bicycle comprising only one rear wheel. The front wheel is mounted in a forked portion 12 of the frame, including an upright steering rod 13 mounted in the body structure 14 formed to simulate an animal, such as a horse, and has a pivotal bearing 15 in a rod 16 extending from the forward part of the main body portion 17 of the horse, and then terminating in a downwardly extending portion 18 connected to the upper end or cross bar 19 of a U-shaped frame having downwardly extending side rods 20 terminating in a bearing 21 for a transverse shaft 22 having offset portions 23 forming cranks, and at their outer ends outside these cranks carrying the rear wheels 11. The main body portion 17 is hollow and preferably made in two half sections with their edges secured together at a longitudinal top joint 24 and a similar lower joint 25. They may be secured by any suitable means, that shown at the top comprising a strap 26 having an intermediate loop 27 to receive and embrace the rod 16 and secured to the two opposite sections 28 and 29 of the body by the screws or bolts 30 passing through these sections adjacent the joint and threaded into the strap or bracket 26. Similar securing means is shown for the lower joint 25, except the strap or bracket 31 does not have the loop 27.

Pivoted to the rear portion of the main body section, as indicated at 32, are the two hind legs 33 of the horse, and these legs are preferably in two sections 33a and 33b pivotally connected at 34 to simulate the hock joints. The sections preferably comprise flat bars covered by a suitable material to simulate the skin and hair of a horse, as will later be described. The lower ends or hoofs 35 are connected to the cranks 23 by the rods 36, so that as the wheels rotate, these cranks, through the rods 36, swing the hind legs back and forth. The pivotal joints 34 are preferably forked joints with limited relative movement between the upper and lower sections of the leg, so that swinging of the lower sections back and forth will also impart back and forth movement of the upper section about the pivotal connections 32 to simulate more fully the natural movements of a horse's legs.

The forward section 37 of the body comprising the head 38, neck 39 and shoulder portions 40, together with the forelegs 41, is pivotally connected to the forward portion of the main body section 14 at the top and bottom by the pivotal connections 42 and 43. These pivotally connections may take different forms, but that shown is a very simple and effective means for connecting the two sections. The upper connection comprises a flat metal plate 44, as shown in Figs. 1 and 5, connected at its upper end to the wooden or other material block 45 in the neck portion by means of the bolts or screws 46, and at its other end it forms a pivot with the bolt 42. Similarly, the pivotal connection at the lower part of this neck section comprises a curved flat plate or strip 47 secured to the lower portion of the block 45 at 48, and at its other end forming a pivot connection on the bolt 43. Pivoted to the lower portion of the block 45 are the forelegs 41 comprising upper and lower sections 49 and 50 pivotally connected at 51 to simulate the knee joints, and pivotally connected to the block 45 at 52. The joint 51 is preferably a forked joint similar to the joints 24 of the hind legs for limited movement between the sections, so that swinging movement of the lower sections 50 will also swing the upper sections 49 to more correctly simulate the natural movements of the forelegs. At the lower ends of the sections 50 are the hoofs 53 connected by rods 54 to the pedal cranks 55 carrying the pedals 56 for operating the front wheel 10.

The rod 13 passes upwardly through the rear or main body section of the horse and extends above it where it terminates in a pair of handlebars for swinging the front wheel 10 for the steering operation. As it swings this wheel to the right or left, it also swings the forward section 37 of the horse's body, comprising the head 38, neck 39, shoulders 40 and the forelegs 41, and a simplified and improved means for effecting this motion is shown in Figs. 3, 4 and 5. Connected to opposite sides of the forward section block 45 are two connecting bars preferably in the form of flat metal strips 58 connected to the block 45 at one end by the bolts or screws 59, and adjacent its other end it is provided with a longitudinal slot 60 for sliding movement on a bolt or screw 61 in the main body sections 28 and 29, there being one of these strips 58 on each side of the block 45, as shown in Figs. 3 and 5. Secured to the steering rod or bar 30 are crank arms 62 connected at their outer ends to links or rods 63 which are connected at their other ends by bolts or screws 64 to the straps 58 adjacent the forward ends thereof, or adjacent the block 45. Through this crank 62 and links 63, turning movements of the steering rod 13 by swinging the crank 62 back and forth, will slide the strips 58 back and forth on the screws or bolts 61, which at the same time will swing the block 45 back and forth to the right and left to correspond, and thus in the action of steering the front wheel 10 the operator will swing the forward section of the horse comprising the head 38, neck 39, shoulders 40 and the forelegs 41 to the right and left to correspond with the steering movements of the front wheel. Also to assist in swinging the horse's head reins 65 are provided leading from the opposite ends of the bit in the horse's mouth to the grips 66 on the handlebars. Also mounted on the main body section 14 is a saddle 67 forming a seat for the rider, and provided with stirrups 68 which may be used for supporting the feet in coasting operations.

The block 45 in the forward section of the body may be covered with suitable flexible rubber-like material 69 which overlaps the forward end portion of the main body section 14 as indicated at 70, to cover up the joint between the two sections, and the free edge of this rubber-like material may be secured to the forward end of the main body section by suitable cement or other securing means. The whole body of the horse including the legs may be covered with similar rubber-like material 71 to give a more natural appearance and shape to the horse, and this may be covered by leather or fabric to simulate the skin and hair covering for the horse.

It will be seen from the above that this provides a very simple and effective structure simulating a horse's body and movable members, and simulating natural movements of the horse in the riding and operation of the cycle, including not only backward and forward movements of both the fore and hind legs of the horse, but also lateral back and forth movements of the head, neck, shoulder and forelegs of the horse in the steering operations of the cycle.

Having thus set forth the nature of my invention, I claim:

1. In a cycle of the character described, a body in the form of an animal comprising front and rear sections, said front section comprising the head, neck and shoulders with forelegs pivotally connected thereto, means pivotally connecting the sections to permit the front section to swing laterally in opposite directions, front and rear wheels supporting the sections, a steering bar extending upwardly from the front wheel through the forward portion of the rear section to the top thereof, handle bar means connected to said bar for steering the front wheel, connecting bars secured to the front section and having a sliding connection to the rear section at opposite sides thereof, crank means secured on the steering bar, and link connections from said crank means to the connecting bars to swing the front section laterally with steering movements of the front wheel.

2. The cycle according to claim 1 in which there are hind legs pivotally connected to the rear section, cranks are connected to the wheels to rotate therewith, and link connections from the cranks to the lower portions of the legs to swing them back and forth with rotation of the wheels and simulate leg action of the animal.

3. The cycle according to claim 1 in which there is a block in the front section forming a support for the head, neck, shoulders and front legs, pivotal means at the upper and lower parts of the body connecting said block to the rear section, and the connecting bars are connected to the block at opposite sides thereof to swing the front section about the pivotal means with the steering action of the steering bar.

References Cited in the file of this patent

UNITED STATES PATENTS

| | | |
|---|---|---|
| 325,408 | Heifman | Sept. 1, 1885 |
| 492,062 | Snyder | Feb. 21, 1893 |
| 763,190 | Madonna | June 21, 1904 |
| 934,797 | Davis | Sept. 21, 1909 |
| 2,646,990 | Fowler | July 28, 1953 |